Dec. 12, 1967     T. BERNOUS ET AL     3,357,249
TEMPERATURE SENSOR
Filed Jan. 3, 1966     3 Sheets-Sheet 1

INVENTORS.
TAYEB BERNOUS
THOMAS P. REDDING
EDWARD A. SCHWARTZ
BY
ATTORNEY

Dec. 12, 1967  T. BERNOUS ET AL  3,357,249
TEMPERATURE SENSOR
Filed Jan. 3, 1966  3 Sheets-Sheet 3

INVENTORS.
TAYEB BERNOUS
THOMAS P. REDDING
EDWARD A. SCHWARTZ

ATTORNEY

United States Patent Office 3,357,249
Patented Dec. 12, 1967

3,357,249
TEMPERATURE SENSOR
Tayeb Bernous, Fairport, Thomas P. Redding, Penfield, and Edward A. Schwartz, Fairport, N.Y., assignors to Xerox Corporation, Rochester, N.Y., a corporation of New York
Filed Jan. 3, 1966, Ser. No. 518,209
2 Claims. (Cl. 73—351)

ABSTRACT OF THE DISCLOSURE

Apparatus for sensing the surface temperature of a rotating cylinder. The apparatus includes a temperature response element partially encased in an insulating cylindrical first support with a thermally conductive cap thereover. The cap is filled with a grease for conducting thermal energy from the cap and the surface to be sensed to the temperature responsive element. The cap and first support are held in an insulating cylindrical second support. The second support is slidingly positioned in an aperture of a fixed bracket for guiding its reciprocation toward and away from the rotating cylinder being sensed. A leaf spring is also provided to resiliently urge the cap into constant contact with the cylinder being sensed.

---

This invention relates in general to temperature responsive resistance devices and in particular to a temperature sensitive resistance device adapted to be positioned in contact with a rotating cylinder.

More specifically, this invention relates to a temperature sensitive resistance device removably encased in a support medium having an abrasion resistant thermally conductive end portion.

While it is obvious that this device has general utility, for convenience of illustration it will be described with reference to its use in a xerographic fusing device of the type described in copending application Ser. No. 400,498 now Patent No. 3,291,466 filed in the name of Gilbert A. Aser et al. on Sept. 30, 1964, and specifically in the control circuit of copending application Ser. No. 400,476 filed Sept. 30, 1964, in the name of Tayeb Bernous.

In the process of xerography, for example, as disclosed in Carlson Patent 2,297,691, issued Oct. 6, 1942, a xerographic plate comprising a layer of photoconductive insulating material on a conductive backing is given a uniform electric charge over its surface and is then exposed to the subject matter to be reproduced, usually by conventional projection techniques. This exposure discharges the plate areas in accordance with the radiation intensity that reaches the plate, and thereby creates an electrostatic latent image on or in the photoconductive layer. Development of the latent image is effected with an electrostatically charged, finely divided powder or toner which is brought into surface contact with the photoconductive layer and is held thereon electrostatically in a pattern corresponding to the electrostatic latent image. Thereafter, the developed xerographic powder image is usually transferred to a support material such as paper to which it may be fixed by any suitable means.

One of the methods in common use for developing the electrostatic latent image is described in Walkup Patent No. 2,618,551, and is known as cascade development, and is in general use for line copy development. In this technique, the powder or toner is mixed with a granular "carrier" material, and this two-component "developer" is poured or cascaded over the plate surface. The function of the carrier material is to improve the flow characteristics of the powder and to produce, on the powder by triboelectrification, the proper electrical charge so that the powder will be attracted to the image. More exactly, the function of the carrier material is to provide the mechanical control to the powder, or to carry the powder to an image surface and, simultaneously, to provide homogeneity of charge polarity.

In the Carlson patent it is noted that a variety of types of finely divided electroscopic powders may be employed for developing electrostatic latent images. However, as the science of xerography has progressed, it has been found preferable to develop line copy images with a powder or toner formed of any of a variety of pigmented thermoplastic resins that have been specifically developed for the purpose. A number of such developing materials are manufactured and marketed commercially and are specifically compounded for producing dense images of high resolution and to have characteristics to permit convenient storage and handling. Such developing materials are compounded to permit them to be fixed to the surface of a transfer material either by heat fixing or vapor fixing techniques, in accordance with the particular application in which they are employed, that is, the individual particles of resin (toner) soften and coalesce when heated or plasticized by solvent, so that they become sticky or tackified and readily adhere to the surface of the support material.

The term "tackified" and the several variant forms thereof used throughout this specification are employed to define the condition of the powder particles of the xerographic powder image when heated or plasticized by a solvent in a manner such that the individual particles soften and coalesce and in which state they become sticky and readily adhere to other surfaces. Although this condition necessarily requires a flowing together of the particles to effect a thorough fusion thereof, it is to be understood that the extent of such flowing is not sufficient to extend beyond the boundary of the pattern in which the particles are formed.

One of the important applications of the process of xerography comprises its use in automatic copying machines for general office use wherein the powder images formed on a xerographic plate are transferred to paper and then fixed thereon by heat fusing. In order to fuse resinous powder images formed of the powdered resins now commonly used, it is necessary to heat the powder and the paper to which it is to be fused to a relatively high temperature, such as approximately 325° F. It is undesirable, however, to raise the temperature of the paper substantially higher than 375° F. because of the tendency of paper to discolor at such elevated temperatures.

With reference to the disclosure in the above copending application Ser. No. 400,498, it is important that the fuser be maintained at a suitable temperature to properly fuse the toner powder carried upon the support material in image configuration. If the fuser mechanism is not heated to a sufficient temperature prior to or during machine operation, the toner powder will not be fixed to the support material resulting in an unuseable copy, easily smeared out of image configuration. In the event the fuser temperature would increase beyond a predetermined point, the support material, usually paper, would be charred, or the moisture content reduced resulting in the paper curling and creating paper jams or a potential fire hazard. In order to closely control the fuser temperature, the control circuit of copending application Ser. No. 400,-476 was developed. The proper functioning of the above-referenced application is dependent upon the prompt and accurate determination of the temperature of the heated roller used in the fusing apparatus. Therefore, it is desirable that such a temperature sensor be placed in physical contact with the fuser roller to prevent any delay in temperature response. However, the placing of a commercially available thermistor in physical contact with the fuser roller creates a number of problems. The thermistors, made of glass, are very fragile, and occurrences of breakage resulting from the thermistor being placed in physical contact with the rotating fuser roller become very numerous. In addition, if the thermistor is placed in physical contact with the rotating surface, point contact only results between the two members causing increased abrasion of the sensing surface of the roller and non-functional response of the thermistor in the event a flaw exists or should occur at the point of contact. A further and extremely important problem exists due to the exposure of the thermistor to ambient air inside the xerographic reproducing machine. Due to the many blowers in the machine performing various essential functions, a bare thermistor would be exposed to many varying air currents resulting in sporadic temperature response.

It is therefore an object of this invention to improve thermal control devices to rapidly and accurately sense temperature.

Another object of this invention is to improve temperature sensor devices by preventing the temperature responsive element from abrading the surface to be sensed.

A further object of this invention is to improve temperature responsive resistance devices by removably encasing the temperature sensitive resistance element in an electrically non-conductive medium to facilitate the replacement thereof.

A still further object of this invention is to improve temperature responsive resistance devices by encasing the temperature sensitive resistance element to minimize the effect of ambient air currents.

These and other objects are attained in accordance with the present invention wherein there is provided a temperature sensitive resistance element removably encased in a support member having an abrasion resistant thermally conductive contact portion.

Further objects of this invention, together with additional features contributing thereto and advantages accruing therefrom, will be apparent from the following description of several embodiments of the invention when read in conjunction with the accompanying drawings, wherein.

Figure 1:
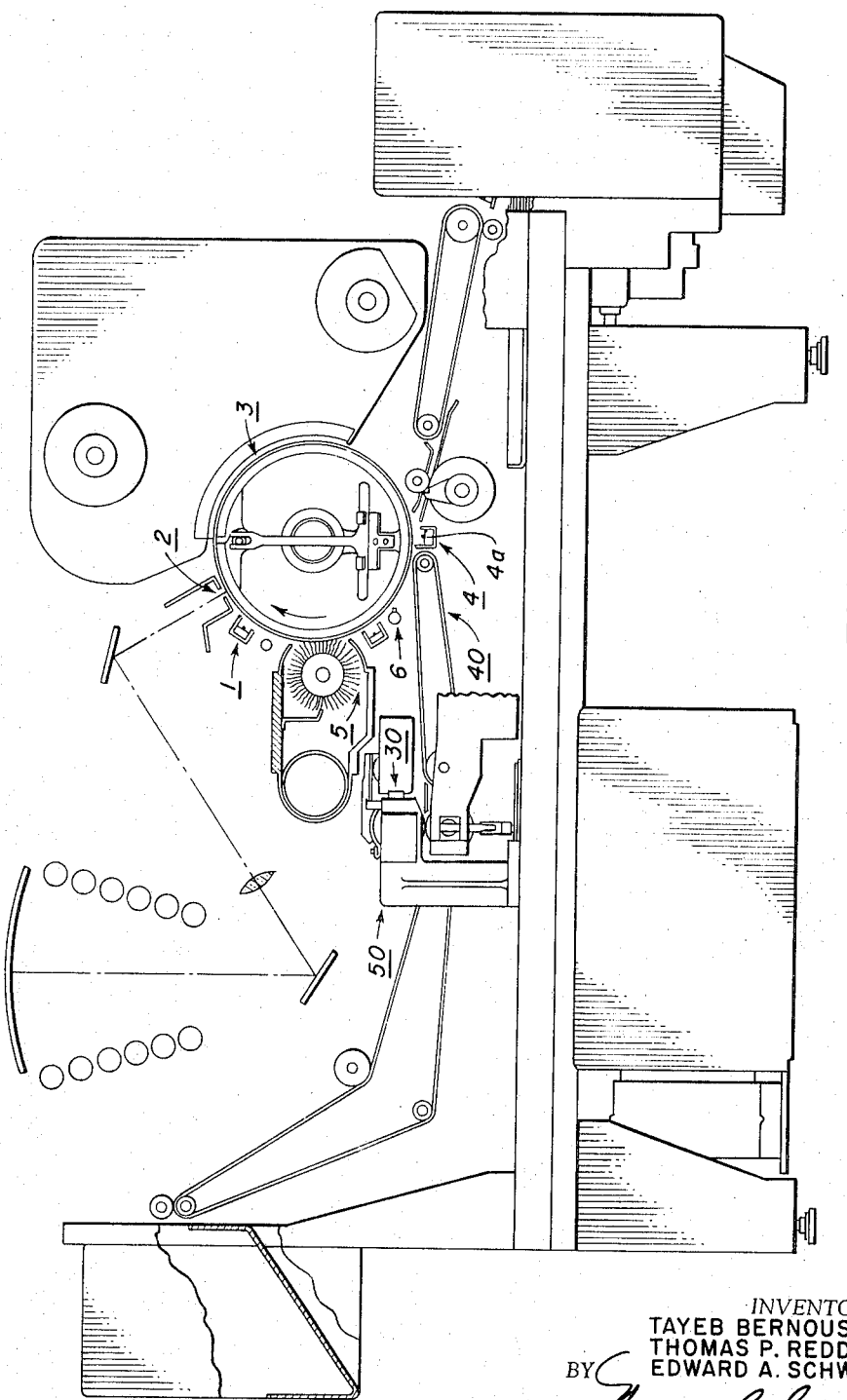
FIG. 1 is a front elevation view of an automatic xerographic reproducing machine utilizing this invention.

Referring now to FIG. 1, there is shown an embodiment of the subject invention in a suitable environment such as an automatic xerographic reproducing machine having a xerographic plate including a photoconductive layer or light-receiving surface on a conductive backing and formed in the shape of a drum which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station 1, at which a uniform electrostatic charge is deposited on the photoconductive layer of the xerographic drum;

An exposure station 2, at which a light or radiation pattern of copy to be reproduced is projected onto the drum surface to dissipate the drum charge in the exposed areas thereof thereby forming a latent electrostatic image of the copy to be reproduced;

A developing station 3, at which xerographic developing material, including toner particles having an electrostatic charge opposite to that of the electrostatic latent image, are cascaded over the drum surface, whereby the toner particles adhere to the electrostatic latent image to form a xerographic powder image in the configuration of the copy being reproduced;

A transfer station 4, at which the xerographic powder image is electrostatically transferred from the drum surface to a transfer or support material; and A drum cleaning and discharge station 5, at which the drum surface is brushed to remove residual toner particles remaining thereon after image transfer, and at which the drum surface is exposed to a relatively bright light source to effect substantially complete discharge of any residual electrostatic charge remaining thereon.

It is believed that the foregoing description is sufficient for the purposes of this application to illustrate the general operation of a xerographic reproducing apparatus utilizing a temperature sensing apparatus constructed in accordance with the invention. For further details concerning the specific construction of the xerographic apparatus shown, reference is made to copending application, Ser. No. 400,542, filed on Sept. 30, 1964, in the name of Robert F. Osborne et al.

At the transfer station 4, the transfer of the xerographic powder image from the drum surface to the sheets of support material is effected by means of a corona transfer device 4a that is located at or immediately after the line of contact between the support material and the rotating drum. In operation, the electrostatic field created by the corona transfer device is effective to tack the support material electrostatically to the drum surface, whereby the support material moves synchronously with the drum while in contact therewith. Simultaneously with the tacking action, the electrostatic field is effective to attract the toner particles comprising the xerographic powder image from the drum surface and cause them to adhere electrostatically to the surface of the support material.

Immediately subsequent to the image transfer station, there is positioned a stripping apparatus 6 for removing the sheets of support material from the drum surface. The sheet stripping apparatus is adapted to strip the leading edge of the support material from the drum surface and to direct it onto an endles conveyor 40 whereby the sheet material is carried to a fixing device 50. At the fixing device, the transferred xerographic powder image on the sheet of support material is permanently fixed or fused thereto as by heat and pressure.

Figure 2:
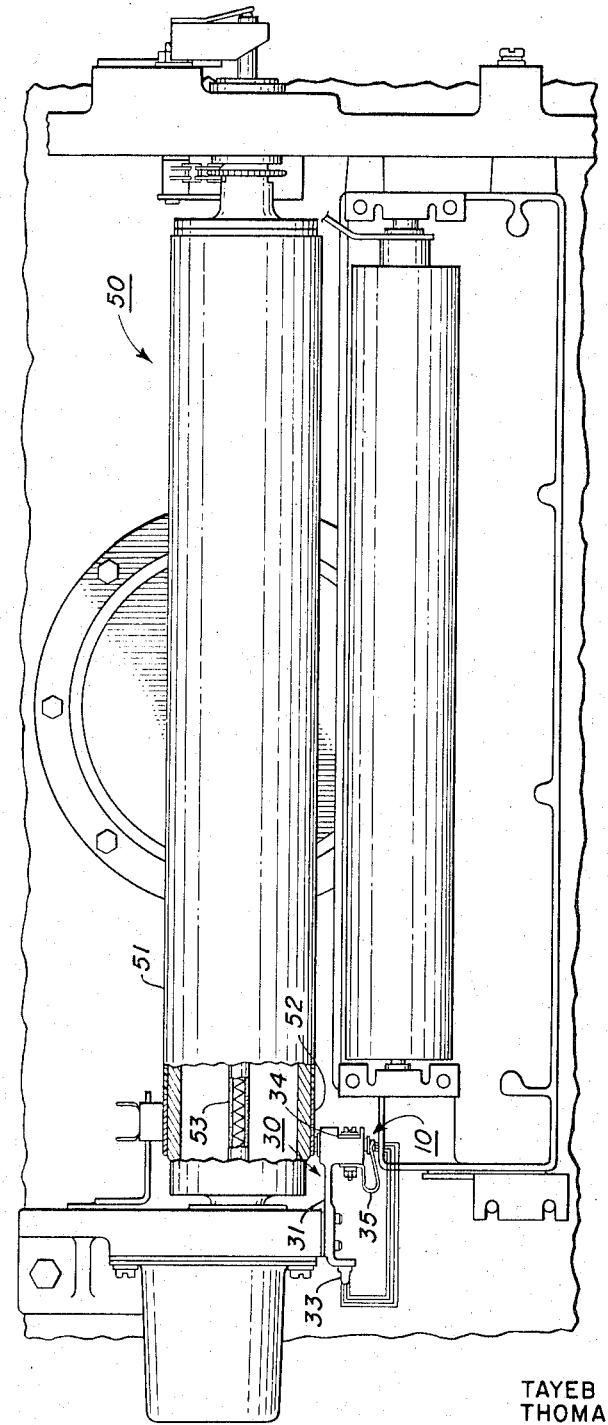
FIG. 2 is an enlarged horizontal elevation view of a portion of the xerographic reproducing machine to better illustrate the use of this invention.
Figure 4:
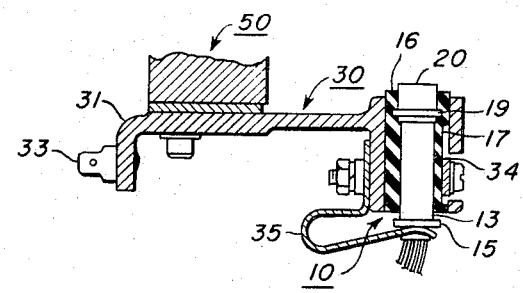
FIG. 4 is a partial section (excluding the temperature sensing portion) of FIG. 3 taken along line 4—4 to better illustrate the construction thereof.
Figure 3:
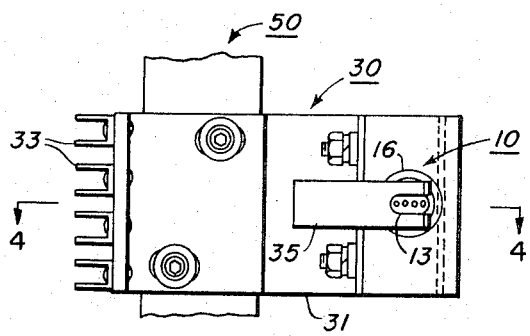
FIG. 3 is a vertical elevation view of the features thereof.
Figure 6:
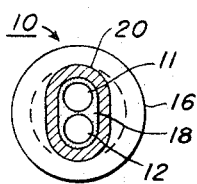
FIG. 6 is a cross-sectional view of FIG. 5 along lines 6—6.
Figure 5:
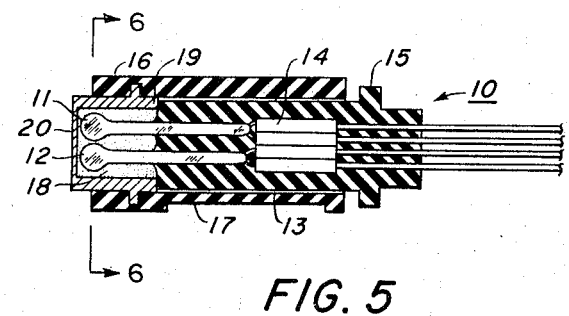
FIG. 5 is a cross-section view of the temperature sensing portion.

For further details of the specific fusing apparatus shown in FIGS. 1 and 2, reference is made to copending application Ser. No. 400,498 filed Sept. 30, 1964, in the name of G. A. Aser et al. Referring now to FIGS. 2 through 6, there is shown an embodiment of the subject invention in a suitable environment such as the above-referenced fusing apparatus.

The specific embodiment of the invention as shown in FIGS. 3 through 6 includes two temperature responsive resistance elements 11 and 12, which may be of any commercially available type such as one-half inch glass probe thermistors, type 55a, or equivalent, available from Victory Engineering (Vecco), Springfield, N.J. However, it is to be understood that the invention is not to be limited thereto.

The temperature responsive resistance elements, or probes, 11 and 12 are secured in a suitable probe support 13 of potting material such as Stycast 1210 available from Emerson and Cuming, Inc., Canton, Mass., with their leads electrically insulated by means of an insulator sleeve 14 to insure a proper electric circuit. The probe support 13 is formed with a ridge 15 adapted to cooperate with a spring 35 for a purpose to be hereinafter described.

The temperature probes 11 and 12 potted in the probe support 13 are removably enclosed in the probe sleeve guard 16 having an end portion or cap 20 secured in one end forming a closure thereof. The cap 20 being of thermally conductive material is placed in physical contact with a body such as a heated roll 51 of the xerographic fusing apparatus 50 as shown in FIG. 2 to control the temperature thereof. A thermally conductive medium 18 such as a silicone based grease type MS984 available from Fenwall, Inc., Framingham, Mass., or Dow-Corning Silicone grease No. 340, in the cap 20 provides a uniform homogeneous temperature medium about the probes 11 and 12 to insure accurate response of the probes to temperature changes of the roller 51. The probe support 13 is of a suitable diameter to be inserted into the probe sleeve guard 16 to contact the edge 19 of the cap 20 whereby the probes 11 and 12 will not touch the cap but be surrounded by the thermally conductive grease 18; however, due to the thermal conductivity of the grease, it is not essential that the thermistor probes be out of contact with the cap 20 but preferably held in that position to prevent any axial force on the probes induced through the spring 35.

An adjustable bracket assembly 30 is provided for supporting the probe assembly 10 in cooperative relation to a portion 52 of the roller 51 and to maintain proper pressure between the probe assembly and roller by means of a spring 35 adjustably mounted on the bracket 31 to maintain a slight pressure on the probe assembly 10 to ensure contact between the two members and to regulate the frictional forces between the cap 20 and the sensing portion 52 of the roller. A bar 34 mounted on the bracket 31 cooperates with a flat portion 17 of the probe guard sleeve 16 to limit transverse motion of the probe assembly in the bracket. Suitable electrical contacts 33 are provided to connect the probes 11 and 12 into an electrical control circuit whereby probe 11 controls the temperature of roller 51 heated by an internal resistance heating element 53, and probe 12 controls a relay contact, not shown, to prevent operation of the xerographic reproducing machine unless the roller is at a predetermined temperature sufficient for fusing the toner powder carried on the support material in image configuration.

While the invention has been described with reference to the structure disclosed herein, it is not confined to the details set forth; and this application is intended to cover such modifications or changes as may come within the purposes of the improvements or the scope of the following claims.

What is claimed is:
1. Apparatus for sensing the surface temperature of a rotating cylinder including
    temperature responsive means,
    a thermally insulating first support means encompassing a portion of said temperature responsive means,
    a thermally conductive cap member positioned to encompass the end of said temperature responsive means and constituting an extension for said first support means,
    a tubular second support means of a thermally insulating material having an internal surface to fixedly position said cap member with respect to said first support means and having an external surface constituting a bearing surface for being slidingly retained within a bracket adjacent the cylindrical surface to be sensed,
    a thermally conductive grease within said cap in contact with the face of said cap and said temperature responsive means,
    electrical contacts connected to said temperature responsive means adapted to be connected to an electrical control circuit,
    and spring biasing means adapted to urge said temperature responsive means, said first and second support means and said cap towards the external surface of a cylinder to be sensed with the face of said cap in sliding contact with the cylinder.

2. The apparatus as set forth in claim 1 wherein said biasing means is a leaf spring having an unsecured first end in urging contact with said first support means and having a second end adapted to be secured to the bracket which guides the direction of sliding of said second support means.

References Cited

UNITED STATES PATENTS

| | | | |
|---|---|---|---|
| 2,915,729 | 12/1959 | Campbell | 338—231 |
| 2,938,385 | 5/1960 | Mack et al. | 73—362 |
| 2,961,625 | 11/1960 | Sion | 73—362 |
| 3,211,893 | 10/1965 | Barlow et al. | 73—351 |

FOREIGN PATENTS

| | | |
|---|---|---|
| 37,426 | 1956 | Germany. |

LOUIS R. PRINCE, *Primary Examiner.*

DAVID SCHONBERG, *Examiner.*

NEIL B. SIEGEL, *Assistant Examiner.*